Patented Dec. 1, 1953

2,661,342

UNITED STATES PATENT OFFICE 2,661,342

PHOSPHOROUS OXYCHLORIDE-ANHYDROUS AMMONIA REACTION PRODUCTS AND WATER-SOLUBLE RESIN COMPOSITIONS FOR RENDERING CELLULOSIC MATERIALS FIRE RESISTANT

John E. Malowan, Dayton, Ohio, assignor to Monsanto Chemical Company, St. Louis, Mo., a corporation of Delaware No Drawing. Application June 21, 1950,
Serial No. 169,514

5 Claims. (Cl. 260—39)

The present invention relates to the treatment of cellulosic materials in order to improve their resistance to fire.

It is an object of the invention to provide a process for rendering cellulosic materials fire-resistant. It is another object of the invention to provide flame-resistant cellulosic products. Still another object of the invention is the modification of textile fibers and other combustible materials containing cellulose to render the same resistant to fire.

It is known in the prior art that cellulosic materials such as textile products can be modified to improve their resistance to fire by treatment with phosphorus compounds. For example, U. S. Patent 2,401,440 describes the treatment of cellulosic products such as alkalized cellulose by treatment first with phosphorus oxychloride and then with ammonia. While the products produced by the process described in this patent contain chemically bound phosphonamide groups, the treatment involved the use of chemical reagents which the textile processing industry was not generally equipped to handle. For this reason a simpler method which would be used in the ordinary textile plant without special equipment or skills was greatly to be desired.

In accordance with the terminology which has been developed in this field "fire-resistance" and "flame-resistance" result from the treatment of a material such as cloth with various chemicals so that it becomes resistant to the propagation of flame across its surface after the igniting flame has been removed; that is, a flame-resistant material will not support combustion independently of an external source of heat. In contact with an open flame, however, or at elevated temperatures, flame-resistant, cellulosic material can be expected to char and decompose.

It has been found that the treatment of combustible, cellulosic materials with a resinous, aminoplast condensation product, together with the water-soluble, nitrogen- and phosphorus-containing product described in copending application Serial No. 169,513, filed June 21, 1950, which application is assigned to the same assignee as is the present case, results in the production of a permanent flame-resistant product of excellent properties, which exhibits substantially the strength of the untreated fabric.

According to the copending application referred to above, the nitrogen- and phosphorus-containing products utilized in the present invention are produced by reacting together phosphorus oxychloride and ammonia, preferably in a solvent. The product produced by this reaction is then heated to a temperature of at least 110° C., but not above 150° C. The above reaction results in the formation of by-product ammonium chloride corresponding in amount to the chlorine present in the phosphorus oxychloride. For the present purpose the ammonium chloride is preferably removed, although some may be present. Purification may be effected by the extraction of the heat-treated phosphorus oxychloride-ammonia reaction product by means of solvents. In general, the extraction is best carried out employing liquid anhydrous ammonia as the extracting solvent, which dissolves the ammonium chloride preferentially leaving the nitrogen-phosphorus compound as a white, non-hygroscopic solid.

In carrying out the process of the invention to produce the present products, the preparation may suitably commence with the solution of phosphorus oxychloride in a solvent. The phosphorus oxychloride so dissolved is then reacted with ammonia in gaseous or liquid form with suitable agitation. The temperature should be maintained below 100° C. during the addition of the ammonia. However, after the addition of at least the stoichiometric proportion of ammonia (5 moles per mole of $POCl_3$) the temperature is raised and the product heated to at least 110° C., but not above 150° C. It has been found that the temperature control within the above limits is essential to prevent the formation of a water-insoluble product on the one hand, and on the other hand to alter the intermediate product so that the subsequent separation and purification steps can be carried out successfully. The reaction of phosphorus oxychloride with ammonia, followed by heating the reaction product to at least 110° C., but not above 150° C., yields the desired composition in a form insoluble in liquid anhydrous ammonia. Ammonium chloride is formed as a by-product by reaction of ammonia with the chlorine present in the phosphorus oxychloride. As a result of the conditions under which the present product is prepared, it has been found to be possible to form the nitrogen-phosphorus product so that it possesses solubility characteristics enabling the subsequent separation of the product from the ammonium chloride to be carried out by differential solubility methods. At the same time the desired product is obtained in a form which is highly reactive with cellulose.

Preferred solvents for carrying out the production of the initial condensation product of ammonia with phosphorus oxychloride are any inert liquid, such as kerosene, naphtha, hexane, benzene, acetone, or other organic liquids which do not react with ammonia or phosphorus oxychloride.

Phosphorus oxychloride to the amount of 90 pounds is dissolved in 90 gallons of hexane contained in an autoclave. The solution is heated to approximately 55° C. while stirring, and gaseous anhydrous ammonia is added thereto. Although an exothermic reaction takes place, the reaction may be carried out at about 75° C. by cooling the vessel. Ammonia to the extent of 50 pounds (5 moles per mole of phosphorus oxychloride) is added to the autoclave over a two hour period. An excess of ammonia may be used. After the addition of this amount of ammonia, the autoclave is sealed and then heated to about 130° C. for approximately 1½ hours. After the completion of the heating period, the reaction mixture is cooled to below 40° C. and then transferred to a second vessel containing a filter element and provided with external heating means. By applying heat to the autoclave contents the hexane present is distilled off, condensed and recovered. The remaining solids which consist of a mixture of the nitrogen- and phosphorus-containing product with ammonium chloride are then extracted under pressure with anhydrous ammonia at about room temperature. A total of about 20 pounds of ammonia per pound of final product is employed, although it is also possible to carry out an extraction with 10 pounds of ammonia per pound of product. The slurry of product in anhydrous liquid ammonia was filtered by means of a filtering device contained within the autoclave. In this manner, substantially all of the ammonium chloride is leached from the residual solids. After the last extraction the residual ammonia adhering to the product is removed by evaporation induced by the application of heat to the product. The yield of the nitrogen-phosphorus product obtained is approximately 85% of the theoretical. The product contains 33.8% nitrogen, 35.1% phosphorus, N/P ratio=2.14. This is an atomic ratio.

The nitrogen-phosphorus product so produced has, when dissolved in aqueous solutions, a pH within the range of from 7.0 to 8.5, a molecular weight of from 180 to 300, a preferred range being from 200 to 250. The nitrogen to phosphorus atomic ratio is from 2.1 to 2.3, the latter ratio depending somewhat upon the temperature employed in the heating step. The so-formed nitrogen-phosphorus product is soluble not only in water, but also in glycerine, ethylene glycol, and formamide.

The resin type of condensation products contemplated in the present invention are the type known as aminoplasts. As is well known, aminoplasts are condensation products or resins derived from amino (including imino) or amido (including imido) compounds, a typical example being urea-formaldehyde resin (reference: Modern Plastics, 17, 433, 1939). Other aminoplasts are described in C. Ellis, Chemistry of Synthetic Resins, chapter 26 (Reinhold Publishing Co., 1935). Preferred examples in the present invention are the formaldehyde condensation products with urea or melamine and also the corresponding furfural condensation products in the same relationship. Such resinous compositions may employ high, medium or low degrees of methylolation (or the corresponding furfural substituents), such, for example, as from 1 to 5 methylol radicals per mole of the acceptor compound in the case of melamine. Mixtures of such condensation products or resins may also be employed.

A preferred group of condensation products are the water-soluble reaction products of formaldehyde with urea or melamine. Condensation products of this type may be produced by reacting either urea or melamine with formaldehyde. Such condensation products are broadly applicable, so that their constitution is not critical in the present invention. These water-soluble types of the condensation products are described in R. L. Wakeman, Chemistry of Commercial Plastics, pages 173–176 (Reinhold Publishing Co., 1947). They are characterized by lower degrees of methylolation, so that the materials, whether liquid or solid, are water-soluble or dispersible, aiding in the ease of application of the combination with the nitrogen-phosphorus condensation product.

Cellulosic textile products are impregnated or coated with the above-described combination of an aminoplast condensation product and the nitrogen-phosphorus-containing product by immersing said textile materials in solutions thereof. Separate containers of each component may be employed, but it is simpler to utilize a single solution. Aqueous solutions are preferred, but other solvents may also be used. The concentration of solutions may vary over a wide range, such as from 5% to 30% by weight of the nitrogen-phosphorus compound, and from 0.5% to 25% by weight of the resinous condensation product, depending upon the desired "add-on" which is to be obtained. It is generally desirable for the present purpose to "add-on" from 5% to 30% by weight of the phosphorus-nitrogen-containing product to the textile fabric, although a range of 2% to 90% may be employed, higher concentrations being preferred in applications where crease- or crush-resistance is desired. The resinous condensation product may be employed in the range of 0.5% to 25% add-on by weight, calculated as final add-on relative to the weight of the original material.

After impregnation of the textile fabric, and in order to produce a wash-fast fabric, the impregnated fabric is dried and then subjected to a temperature of at least 100° C., but below 200° C. If it is not necessary to produce a wash-fast product the heating step may be omitted.

The following examples illustrate this invention:

*Example 1*

An aqueous solution was prepared containing 30% of the water-soluble, alkaline condensation product of phosphorus oxychloride and anhydrous ammonia. The solution also contained 1.5% of a water-soluble resin or condensation product of urea and formaldehyde. A sample of cotton (sheeting weight) was passed through the solution to obtain a wet add-on of approximately 85%, after which the material was dried and then cured in an oven at 140° C. for 30 minutes.

The treated material was subjected to the standard tests for afterflaming and afterglowing. These tests are described by R. W. Little in Flameproofing Textile Materials, pages 111 to 115 (Reinhold Publishing Co., 1947). The material of the present example was found to show no afterglow nor afterflaming, either upon the sample as prepared or after being washed three times under household conditions.

*Example 2*

A sample of cotton sheeting was prepared similarly to the method of Example 1, but utilizing an aqueous solution containing 30% by weight of the nitrogen- and phosphorus-containing containing condensation product together with 8% of the water-soluble, melamine-formaldehyde condensation product.

The treated fabric was washed to determine the retention of the treatment, and was then subjected to the standard flame- and glow-resistance tests. The treated material did not display any afterflaming, and was also found to be free of afterglow effects.

*Example 3*

An aqueous solution was prepared containing 22% of the water-soluble alkaline condensation product of phosphorus oxychloride and anhydrous ammonia, together with 10% of a water-soluble, condensation product of melamine and formaldehyde. A sample of sheeting weight cotton was passed through this solution, after which the sample of cotton was air dried, and was then cured at 150° C. for a period of 10 minutes. The treated material was then used in a reactivity test as described below, and was also subjected to the flame-retardancy and glow-retardancy tests. It was found that the treated fabric did not burn nor glow after the removal of the test flame.

The treated material was subjected to the standard fire-retardancy tests, as described above, and was found to exhibit no afterglow nor afterflaming, either upon the sample prepared as described above, or upon samples subjected to three standard household launderings.

A control test was also performed in which a sample of the sheeting grade of cotton was treated with an aqueous solution containing 20% of the water-soluble condensation product of melamine and formaldehyde. The treated material was cured in the same manner as described above, and was then subjected to the standard tests. It was found that the treated fabric burned when subjected to a test flame and continued to burn after the removal of the flame so that the entire sample was consumed by a direct combustion before any afterglow effect could be realized. This is indicative of the efficacy of the combination of the phosphorus-nitrogen condensation product in combination with resin or condensation product such as an aminoplast for the purpose of preventing both afterflaming and afterglowing of a cellulosic material which maintains such fire-retardant properties despite exposure to water and washing.

It was found that the samples of fabric treated as described in the above examples also exhibited the property of crease-resistance.

Further characterization of the products of the present invention, and an indication of the reactivity with cellulose is afforded by application of the following test procedure, described by F. V. Davis et al. in the Journal of the Textile Institute, 40, pages T 839–T 854 (1949).

For the present purpose the method of Davis et al. was modified in such a manner as to increase the criticality of the reactivity test. The modification consisted in washing the treated fabric with a synthetic detergent solution at 120° F., followed by a cycle of three rinses, also conducted at 120° F., rather than by conducting the entire washing in distilled water. The degree of reactivity was obtained by drying the impregnated cotton fabric at 220° F., and then weighing the fabric samples to determine the amount of the nitrogen-phosphorus product remaining, which, it may be assumed, had combined chemically with the cellulose of the fabric.

The test utilized to determine the cellulose reactivity of the present and related products is carried out by contacting a standard sample of desized cotton, of sheeting weight, with an aqueous solution containing 6% by weight of solids of the present nitrogen-phosphorus compound. The cotton is allowed to take up about 100% of its weight of the solution, after which the impregnated sample is dried and then cured by heating for 10 minutes at 150° C. The sample is then washed at 120° F. in a synthetic detergent-containing solution, which washing is then followed by three standard rinses with water also carried out at 120° F. After washing and rinsing, as described above, followed by drying to constant weight, the sample is weighed and the add-on thus determined. The amount of nitrogen-phosphorus compound retained by the washed sample in comparison with the amount retained on an unwashed sample is a measure of the amount of the product adhering to the fabric by reason of its chemical activity therewith. The relative amounts can be expressed in per cent. As a result of this test, the present nitrogen-phosphorus compound is found to possess a reactivity of 80–90%, which means that 80–90% of the nitrogen-phosphorus compound applied to the cellulose has combined chemically therewith. In comparison with the present product the higher molecular weight, water-insoluble products which are described in application Serial No. 68,402, filed December 30, 1948 now U. S. Patent 2,596,935, applied by means of an aqueous dispersion, have a reactivity of approximately 20%. The above reactivity test may also be employed to evaluate the cellulose reactivity of other prior art materials such, for example, as guanidine phosphate, which material was found by this test to have a reactivity with cellulose of 31%.

The table below summarizes the cellulose reactivity of the several phosphorus compounds mentioned above and includes in addition several other products. The data obtained with the urea-diammonium phosphorus composition were taken from the book by R. W. Little; Flameproofing of Textile Fabrics.

TABLE

*Cellulose reactivity of phosphorus compounds*

| | Per cent |
|---|---|
| Example 3 | 56 |
| Water-insoluble nitrogen-phosphorus product | 20 |
| Diammonium phosphate | 0 |
| Urea-diammonium phosphate | 35 |
| Guanidine phosphate | 31 |
| Diammonium pyrophosphate | (1) |

¹ Degraded, causing fiber loss.

In general, the products of the present invention exhibit excellent reactivity, e. g., in the range of 50–80%, showing that the combination of the aminoplast resin with the water-soluble, nitrogen-phosphorus product gives a fire-retardant treatment which is substantially wash-fast.

In general, it has been found that the proportion of the water-soluble, alkaline condensation product of phosphorus oxychloride and anhydrous ammonia may be employed in a range of from 5% to 30% by weight calculated as the add-on of the final treated material. The proportion of the aminoplast condensation product employed in combination therewith may vary from 25% to 0.5% in the same relationship. The curing conditions which are utilized to secure improved adherence of the chemical components upon the cellulosic material may be varied from 100° C. to 200° C., a preferred range being from 130° C. to 170° C. with a shorter curing time being possible at the higher temperatures.

What is claimed is:

1. The process for the treatment of cellulosic textiles which comprises impregnating the said textiles with an aqueous solution of a water-soluble urea-formaldehyde resin and a nitrogen- and phosphorus-containing product obtained by reacting one mole of phosphorus oxychloride with at least five moles of anhydrous ammonia in an inert solvent, which dissolves but does not react with the said reactants, at a temperature below 100° C., to produce an initially-formed, anhydrous-ammonia-soluble product mixed with ammonium chloride, then heating said initially-formed nitrogen- and phosphorus-containing product to a temperature of at least 110° C., but below 150° C., until said nitrogen- and phosphorus-containing product is rendered substantially insoluble in liquid anhydrous ammonia, and has a molecular weight within the limits of from 180 to 300, a nitrogen/phosphorus atomic ratio within the limits of from 2.1 to 2.3 and when dissolved as a saturated solution in water yields a solution having a pH within the limits of 7.0 to 8.5, and thereafter drying the said impregnated cellulosic textiles said treated cellulosic textiles containing 0.5% to 25% by weight of the said resin and 2% to 90% by weight of the said nitrogen- and phosphorus-containing product.

2. The process for the treatment of cellulosic textiles which comprises impregnating the said textiles with an aqueous solution of a water-soluble melamine-formaldehyde resin and a nitrogen- and phosphorus-containing product obtained by reacting one mole of phosphorus oxychloride with at least five moles of anhydrous ammonia in an inert solvent, which dissolves but does not react with the said reactants, at a temperature below 100° C., to produce an initially-formed, anhydrous - ammonia - soluble product mixed with ammonium chloride, then heating said initially-formed nitrogen-and phosphorus-containing product to a temperature of at least 110° C., but below 150° C., until said nitrogen- and phosphorus-containing product is rendered substantially insoluble in liquid anhydrous ammonia, and exhibits a pH within the range of 7.0 to 8.5 in aqueous solution, a nitrogen/phosphorus atomic ratio within the limits of from 2.1 to 2.3, and has a molecular weight of from 180 to 300, said treated cellulosic textiles containing 0.5% to 25% by weight of the said resin and 2% to 90% by weight of the said nitrogen- and phosphorus-containing product and thereafter drying the said impregnated textiles.

3. The process for the treatment of cellulosic textiles which comprises impregnating the said textiles with an aqueous solution of a water-soluble resin selected from the group consisting of urea-formaldehyde, melamine-formaldehyde, urea-furfural and melamine-furfural resins and containing a nitrogen- and phosphorus-containing product obtained by reacting one mole of phosphorus oxychloride with at least five moles of anhydrous ammonia in an inert solvent, which dissolves but does not react with the said reactants, at a temperature below 100° C., to produce an initially-formed, anhydrous-ammonia-soluble product mixed with ammonium chloride, then heating said initially-formed nitrogen- and phosphorus-containing product to a temperature of at least 110° C., but below 150° C., until said nitrogen- and phosphorus-containing product is rendered substantially insoluble in liquid anhydrous ammonia, and exhibits a pH within the range of 7.0 to 8.5 in aqueous solution, a nitrogen/phosphorus atomic ratio within the limits of from 2.1 to 2.3, and has a molecular weight of from 180 to 300, said treated cellulosic textiles containing 0.5% to 25% by weight of the said resin and 2% to 90% by weight of the said nitrogen- and phosphorus-containing product and thereafter drying the said impregnated textiles.

4. A composition of matter for the flameproofing of cellulosic textiles comprising a water-soluble resin selected from the group consisting of urea-formaldehyde, melamine-formaldehyde, urea-furfural, and melamine-furfural, and containing a nitrogen- and phosphorus-containing product obtained by reacting one mole of phosphorus oxychloride with at least five moles of anhydrous ammonia in an inert solvent, which dissolves but does not react with the said reactants, at a temperature below 100° C., to produce an initially-formed, anhydrous-ammonia-soluble product mixed with ammonium chloride, then heating said initially-formed nitrogen- and phosphorus-containing product to a temperature of at least 110° C., but below 150° C., until said nitrogen- and phosphorus-containing product is rendered substantially insoluble in liquid anhydrous ammonia and has a molecular weight within the limits of from 180 to 300, a nitrogen/phosphorus atomic ratio within the limits of from 2.1 to 2.3 and when dissolved as a saturated solution in water yields a solution having a pH within the limits of 7.0 to 8.5, said treated cellulosic material containing 0.5% to 25% by weight of the said resin and 2% to 90% by weight of the said nitrogen- and phosphorus-containing product.

5. A new article of manufacture comprising a cellulosic textile having its fibers coated with a melamine-formaldehyde resin and a nitrogen- and phosphorus-containing product obtained by reacting one mole of phosphorus oxychloride with at least five moles of ammonia in an inert solvent which dissolves but does not react with the said reactants, at a temperature below 100° C., to produce an initially-formed, anhydrous-ammonia-soluble product mixed with ammonium chloride, then heating said initially-formed nitrogen- and phosphorus-containing product to a temperature of at least 110° C., but below 150° C., until said nitrogen- and phosphorus-containing product is rendered substantially insoluble in liquid anhydrous ammonia and has a molecular weight within the limits of from 180 to 300, a nitrogen/phosphorus atomic ratio within the limits of from 2.1 to 2.3 and when dissolved as a saturated solution in water yields a solution having a pH within the limits of 7.0 to 8.5, said treated cellulosic material containing 0.5% to 25% by weight of the said resin and 2% to 90% by weight of the said nitrogen- and phosphorus-containing product.

JOHN E. MALOWAN.

References Cited in the file of this patent

UNITED STATES PATENTS

| Number | Name | Date |
|---|---|---|
| 2,052,886 | Leroy | Sept. 1, 1936 |
| 2,401,440 | Thomas et al. | Jan. 4, 1946 |
| 2,462,803 | Campbell et al. | Feb. 22, 1949 |
| 2,464,342 | Pollak et al. | Mar. 15, 1949 |